March 28, 1944. J. McMULLEN 2,345,141
COMBINED WASHER AND COTTER PIN SPREADER
Filed Aug. 23, 1943

JOHN McMULLEN
INVENTOR.

BY Samuel Reese
~ATT'Y~

Patented Mar. 28, 1944

2,345,141

UNITED STATES PATENT OFFICE 2,345,141

COMBINED WASHER AND COTTER PIN SPREADER

John McMullen, Buffalo, N. Y.

Application August 23, 1943, Serial No. 499,734

7 Claims. (Cl. 85—50)

The invention relates to combined washer and cotter pin spreaders.

It is an object of this invention to provide washer and cotter pin spreaders so constructed as to materially enhance their period of usefulness.

A further object is to provide devices of the character stated so formed as to embody integral means for obviating movement of cotter pins and resulting wear in said devices without increasing the cost of the devices.

A further object is to provide combined washer and cotter pin spreaders so constructed as to compensate for misalinement between them and the members with which they are associated.

Other objects of the invention will become clear as the description thereof proceeds.

In the drawing forming part of this specification:

Figure 1:
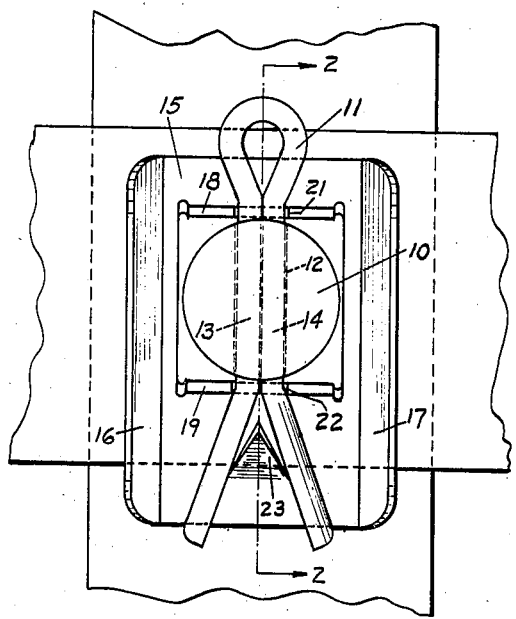
Fig. 1 is an elevation showing a device embodying the invention mounted upon a bolt of a car brake mechanism.
Figure 2:
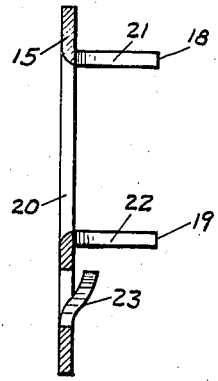
Fig. 2 is a vertical section taken on line 2—2 of Fig. 1, omitting the bolt and cotter pin to better show the invention.

Referring first to the embodiment of the invention illustrated in Figs. 1 and 2 of the drawing, the numeral 10 represents a bolt of a car brake mechanism with which the invention is associated. In order to retain the bolt 10 in its position a cotter pin 11 adapted to pass through a vertical hole 12 in the bolt is customarily employed. For the purpose of quickly and effectively locking the cotter pin in its operative position, the instant invention provides a construction whereby the legs 13 and 14 of the cotter pin are automatically spread apart as the cotter pin is driven to position. Moreover, by reason of the instant invention, which is an improvement upon my Patent No. 1,751,013, granted March 18, 1930, means is provided whereby movement of the cotter pin transversely of the bolt is prevented or substantially restrained so that the life of the construction is greatly extended.

My construction embodies a plate member 15, which constitutes a washer and which is flanged outwardly along its vertical margins, as indicated at 16 and 17, to provide reinforcing portions. The plate 15 is slit horizontally and vertically and the resulting portions pressed outwardly in order to provide vertically spaced, outwardly extending flanges 18 and 19 and an opening 20 through which the bolt 10 is adapted to extend. The flanges 18 and 19 are formed with slots 21 and 22 which are adapted to aline with the vertical hole 12 formed in the bolt 10. When the bolt is in position between the flanges 18 and 19 the cotter pin 11 is driven downwardly through the slots 21 and 22 and the hole 12. As the cotter pin is forced downwardly below the flange 19, it engages a substantially triangular spur 23 struck outwardly from the plate 15 and the legs 13 and 14 of the cotter pin are thereby spread, as more clearly shown in Fig. 1 of the drawing, in order to securely lock the cotter pin in position.

By means of the considered construction, the cotter pin is held in position by means of the flanges 18 and 19 so that any tendency of the cotter pin to move transversely under action of the bolt is prevented or greatly reduced. The destructive effect of such movement upon the cotter pin spreader of applicant's patent is thereby obviated and the life of the washer and cotter pin spreader is substantially increased. Moreover, in view of the provision of the slots 21 and 22 in the flanges 18 and 19, any misalinement occurring between the hole 12 in the bolt and holes in the flanges in a direction lengthwise of the bolt is compensated for. The value of the washer and cotter pin spreader is thereby further enhanced.

Figure 3:
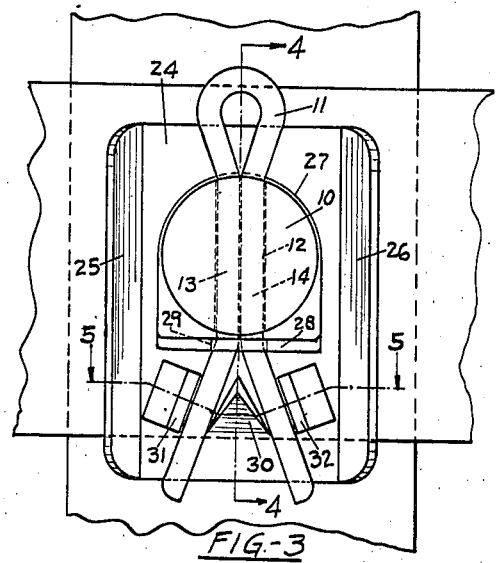
Fig. 3 is a view similar to Fig. 1 showing a modified form of the invention.
Figure 4:
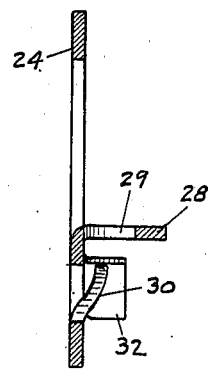
Fig. 4 is a vertical section taken on line 4—4 of Fig. 3, omitting the bolt and cotter pin to better show the invention.
Figure 5:
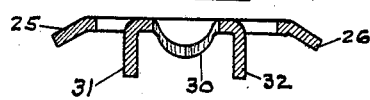
Fig. 5 is a section taken on line 5—5 of Fig. 3.

A modified form of the invention is illustrated in Figs. 3, 4, and 5 of the drawing. In this form a combined washer and cotter pin spreader 24 is utilized. Vertical reinforcing flanges 25 and 26 are provided as in the first embodiment of the invention. The washer and cotter pin spreader is formed with an opening 27 through which a bolt 10 is adapted to extend. Below the opening 27, the washer and cotter pin spreader is formed with an outwardly extending flange 28 struck therefrom and formed with an opening 29. A substantially triangular spur 30 is struck from the washer and cotter pin spreader below the flange 28.

On either side of the spur 30 the washer and cotter pin spreader is slit and the material thereof struck outwardly in order to form flanges 31 and 32. When the cotter pin is driven downwardly through the vertical hole 12 formed in the bolt 10, it passes through the opening 29 in the flange 28 and then engages the spur 30 which, as the pin is forced downwardly, spreads the legs 13 and 14 thereof, as more clearly shown in Fig.

3 of the drawing. From this figure it will be clear that the flanges 31 and 32 struck from the washer and cotter pin spreader are disposed so as to lie contiguous to and parallel with the spread portions of the legs of the cotter pin. In this manner, movement of the cotter pin under the action of the bolt, which might otherwise wear away the sides of the opening 29, is prevented or substantially reduced, thereby enhancing the life of the considered embodiment of the invention.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. A combined washer and cotter pin spreader device having an opening through which a bolt is adapted to extend, an outwardly extending flange disposed below said opening and having an aperture through which a cotter pin is adapted to pass, a cotter pin spreader disposed below said aperture in said flange and means struck from said device and engageable by a cotter pin passing through said aperture in said flange to restrain transverse movement of the cotter pin.

2. A combined washer and cotter pin spreader device having an opening through which a bolt is adapted to extend, outwardly extending flanges disposed respectively above and below said opening, said flanges having apertures through which a cotter pin is adapted to extend, and a cotter pin spreader disposed below the aperture in the lower of said flanges.

3. A combined washer and cotter pin spreader device having an opening through which a bolt is adapted to extend, outwardly extending flanges disposed respectively above and below said opening, said flanges having apertures through which a cotter pin is adapted to extend, said flange apertures being in the form of slots, and a cotter pin spreader disposed below the aperture in the lower of said flanges.

4. A combined washer and cotter pin spreader device having an opening through which a bolt is adapted to extend, an outwardly extending flange disposed below said opening and having an aperture through which a cotter pin is adapted to pass, a cotter pin spreader disposed below said aperture in said flange and flanges disposed on opposite sides of said spreader, said latter flanges being adapted to engage the legs of a cotter pin subsequent to the spreading of said legs to restrain transverse movement of the cotter pin.

5. A combined washer and cotter pin spreader device having an opening through which a bolt is adapted to extend, an outwardly extending flange disposed below said opening and having an aperture through which a cotter pin is adapted to pass, a cotter pin spreader disposed below the aperture in said flange, and flanges disposed on opposite sides of said spreader, said latter flanges being parallel to the spread portions of the legs of the cotter pin and adapted to be engaged by the spread portions of said legs to restrain transverse movement of the cotter pin.

6. A combined washer and cotter pin spreader device comprising a flange struck from said device and bent downwardly and outwardly therefrom, a second flange struck from said device and bent outwardly and upwardly therefrom, said flanges providing an opening between them through which a bolt is adapted to extend, apertures formed in said flanges through which a cotter pin is adapted to pass, and a cotter pin spreader struck from said device and disposed below the aperture in said first mentioned flange.

7. A combined washer and cotter pin spreader device comprising a flange struck from said device and bent downwardly and outwardly therefrom, a second flange struck from said device and bent outwardly and upwardly therefrom, said flanges providing an opening between them through which a bolt is adapted to extend, slots formed in said flanges through which a cotter pin is adapted to pass, and a cotter pin spreader struck from said device and disposed below the slot in said first mentioned flange.

JOHN McMULLEN.